(12) United States Patent
Cannady (10) Patent No.: US 12,135,055 B2
(45) Date of Patent: Nov. 5, 2024

(54) SCREW WITH INTEGRATED SLOT (71) Applicant: Tate Cannady, Wichita, KS (US)

(72) Inventor: Tate Cannady, Wichita, KS (US)

( * ) Notice: Subject to any disclaimer, the term of this patent is extended or adjusted under 35 U.S.C. 154(b) by 486 days.

(21) Appl. No.: 17/569,026

(22) Filed: Jan. 5, 2022

(65) Prior Publication Data
US 2022/0213921 A1    Jul. 7, 2022

Related U.S. Application Data (60) Provisional application No. 63/134,383, filed on Jan. 6, 2021.

(51) Int. Cl.
*G02C 5/00* (2006.01)
*F16B 39/28* (2006.01)

(52) U.S. Cl.
CPC .............. *F16B 39/28* (2013.01); *G02C 5/00* (2013.01); *G02C 2200/06* (2013.01)

(58) Field of Classification Search
CPC .......... F16B 39/28; F16B 33/02; F16B 39/34; G02C 5/00; G02C 2200/06; G02C 5/2281
See application file for complete search history.

(56) References Cited

U.S. PATENT DOCUMENTS

| 5,407,312 | A  | * | 4/1995 | Terrizzi | F16B 39/225 |
| | | | | | 411/304 |
| 5,947,668 | A  | * | 9/1999 | Thommes | F16B 39/34 |
| | | | | | 411/304 |
| 7,841,818 | B2 | * | 11/2010 | Attanasio | F16B 37/044 |
| | | | | | 411/353 |
| 11,644,691 | B2 | * | 5/2023 | Gallagher | A44C 17/02 |
| | | | | | 351/51 |

\* cited by examiner

*Primary Examiner* — Tuyen Tra
(74) *Attorney, Agent, or Firm* — Brennan, Manna & Diamond, LLC (57) ABSTRACT

The present invention relates to a novel screw that causes drag and prohibits unwinding of the screw. The screw is designed for use in eyeglasses for securing eyeglass lenses and prohibiting same from falling out. The screw includes a fillister head, a drive disposed on the head for engaging a screwdriver, a shaft running from the head to a terminal end, the shaft having non-contiguous circumferential threads along the length of the shaft for rotatably sliding the screw through slots. The screw includes a longitudinal channel in the form of a slot disposed along the surface of the shaft and through the length of the shaft. A planar bar of neoprene or any other polypropene can be inserted in the channel which assists with prohibiting unwinding of the screw when the screw is in use.

20 Claims, 5 Drawing Sheets

SCREW WITH INTEGRATED SLOT

CROSS-REFERENCE TO RELATED APPLICATION

The present application claims priority to, and the benefit of, U.S. Provisional Application No. 63/134,383, which was filed on Jan. 6, 2021 and is incorporated herein by reference in its entirety.

FIELD OF THE INVENTION

The present invention relates generally to the field of eyeglass lenses securing screws. More specifically, the present invention relates to a novel screw that prevents eyeglass lenses from falling out. The screw ensures that the lenses remain intact and do not become loose. More specifically, the screw is a small screw with an integrated groove or slot along the length and surface of the screw. The slot is filled with a neoprene, polypropylene, or polypropene planar bar that causes drag and prevents automatic unwinding of the screw, thereby, securing the lenses effectively in the eyeglass frame. Accordingly, the present disclosure makes specific reference thereto. Nonetheless, it is to be appreciated that aspects of the present invention are also equally applicable to other like applications, devices, and methods of manufacture.

BACKGROUND

By way of background, small screws are used in eyeglasses for securing the components such as nose pads, temples, hinges, rims, and lenses. These small screws, especially, used for securing lenses are important as they keep the expensive lenses secure within the eyeglass frame and rim. These small screws have a tendency to back out which can cause lenses to fall out. This is not only costly for individuals but individuals also face difficulties in performing daily work until the lenses are replaced.

The small screws loosen and fall easily and when they fall on the ground, are extremely difficult to locate. The screws can go under a table and other furniture and individuals may have to bend over and spend time in locating them. Older individuals wearing eyeglasses are generally not able to locate these screws and thus have to go an optician to replace them.

The aforementioned screws are required to be periodically tightened and replaced with new screws. Further, the screws are difficult to be reinstalled in an eyeglass. Individuals need a small screwdriver to reinstall the screws and without wearing glasses, it is nearly impossible for individuals to install the screws without a magnifying lens.

Heretofore known screws are rotatably threaded screws that need to be rotated to slidably insert into the slots for tightening and securing the lenses and/or temples. These threaded screws generally become loose over time and back out which leads to falling of the lenses or separation of the temple from the rim. Individuals desire improved screws that do not back out in order to prevent eyeglass lenses from falling out of the rim and to prevent temples from separating from the rim.

Therefore, there exists a long felt need in the art for improved eyeglass lens, rim, and temple securing screws that prevent eyeglass lenses from falling out of the rim. There is also a long felt need in the art for an eyeglass screw that does not become loose easily. Additionally, there is a long felt need in the art for improved screws for eyeglasses that remain securely in place to keep lenses and temples intact. Moreover, there is a long felt need in the art for an improved eyeglass screw that saves unnecessary expenses for users by eliminating falling of eyeglass lenses. Further, there is a long felt need in the art for an eyeglass screw that can be screwed using a conventional screwdriver. Furthermore, there is a long felt need in the art for an eyeglass screw that increases life of the eyeglass lenses, temples, and rims. Finally, there is a long felt need in the art for a small screw that is not likely to be lost on the floor and therefore eliminates inconvenient repairs.

The subject matter disclosed and claimed herein, in one embodiment thereof, comprises an eyeglass lens, rim, end piece, and/or temple screw; hereinafter, referred to as eyeglasses screw. The eyeglasses screw is designed to install in eyeglasses to secure the eyeglass lenses, temples, and rim to prevent the lenses from falling out. The eyeglasses screw includes a head, a shaft, a slot channel cut along the length of the shaft, the slot channel is filled with a neoprene or polypropene material wherein the filled material causes a drag and prevents unwinding (i.e. unscrewing) of the screw during use of the eyeglasses having the installed screw secured therein. The screw can be used for fastening the upper frame or rim component and the lower frame or rim component to secure the eyeglass lenses therebetween.

In this manner, the novel eyeglass screw of the present invention accomplishes all of the forgoing objectives and provides users with a unique screw that prevents eyeglass lenses from falling out. The screw does not become loosened and does not fall on the floor. Using the screws, the eyeglass lenses remain secure and therefore eliminates inconvenient repairs. The screws save expenses for the user and can be installed in both new eyeglasses and during repair of existing eyeglasses.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a novel screw that causes drag and prohibits automatic unwinding or unscrewing of the screw. The screw further comprising a fillister head, a drive disposed on the head for engaging a screwdriver, a shaft running from the head to a terminal end, the shaft includes circumferential threads along the length of the shaft for rotatably sliding the screw through slots, a longitudinal channel in the form of a slot disposed along the surface of the shaft and through the length of the shaft wherein the threads are absent along the longitudinal channel, and the channel is configured for receiving a planar bar such the planar bar securely fits into the channel. The channel with the planar bar helps in preventing automatic unwinding of the screw when the screw is in use. It is to be appreciated that a fillister head machine screw, sometimes called a cheese head screw, is similar to a pan head machine screw but with greater side height. Fillister head screws are similar to pan head machine screws but with greater side height.

In yet another embodiment, the planar bar does not have threads and is made from neoprene or polypropene.

In yet another embodiment, the shaft is cylindrical and includes threads in the form of grooves or cuts in the shaft, wherein the threads are interrupted by the planar bar.

In yet another embodiment, the screw is made from lightweight metal, alloy, or stainless steel.

In yet another embodiment, the screw is a 0-64 threaded screw.

In yet another embodiment, an eyeglasses screw is disclosed. The eyeglasses screw is designed to install in an eyeglass to secure the eyeglass lenses and prevent them from falling out. The eyeglasses screw includes a head, a shaft, a slot channel cut along the length of the shaft, the slot channel can be filled with a neoprene or polypropene material, wherein the filled material causes a drag and prevents unwinding or unscrewing of the screw during use of the eyeglasses. The screw is used for fastening the upper frame or rim component and the lower frame or rim component to secure the eyeglass lenses.

In yet another embodiment, the screws remain securely in place to keep lenses intact.

In yet another embodiment, the screws can be used for fastening nose pads, end pieces, and temples of the eyeglasses.

In yet another embodiment, eyeglasses having novel screws for securing the lenses is disclosed. The eyeglasses include an upper frame or rim component, a lower frame or rim component, two lenses aligned with left and right eyes of a wearer, the upper frame component having a slot for fastening each lens, a lower frame component having a slot for each lens, a novel screw having a slot along the shaft length filled by neoprene or polypropene can be used for fastening the slot of the upper frame component and the corresponding slot of the lower frame component to secure the lens for the left eye therebetween, a similar novel screw is used for fastening the slot of the upper frame component and the corresponding slot of the lower frame component to secure the lens for the right eye therebetween, wherein the novel screws cause drag and prohibits automatic unwinding or unscrewing of the screws and prohibits unfastening of the upper frame components and the lower frame components.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long felt need in the art for improved eyeglass lens, rim, and temple securing screws that prevent eyeglass lenses from falling out of the rim. There is also a long felt need in the art for an eyeglass screw that does not become loose easily. Additionally, there is a long felt need in the art for improved screws for eyeglasses that remain securely in place to keep lenses and temples intact. Moreover, there is a long felt need in the art for an improved eyeglass screw that saves unnecessary expenses for users by eliminating falling of eyeglass lenses. Further, there is a long felt need in the art for an eyeglass screw that can be screwed using a conventional screwdriver. Furthermore, there is a long felt need in the art for an eyeglass screw that increases life of the eyeglass lenses, temples, end pieces, hinges, and rims. Finally, there is a long felt need in the art for a small screw that is not likely to be lost on the floor and therefore eliminates inconvenient repairs.

The present invention, in one exemplary embodiment, is a novel screw that causes drag and prevents automatic unwinding of the screw. The screw further comprising a head at one terminal end, a drive disposed on the head for engaging a screwdriver, and a shaft running from the head to another terminal end. The shaft includes circumferential cuts or threads along the length of the shaft for rotatably sliding the screw through slots using the screwdriver, a longitudinal channel in the form of a slot disposed along the surface of the shaft and through the length of the shaft wherein the threads are absent or interrupted along the longitudinal channel. The channel is filled with a planar bar of neoprene or polypropene material that helps in preventing automatic unwinding of the screw when the screw is in use.

Figure 1:
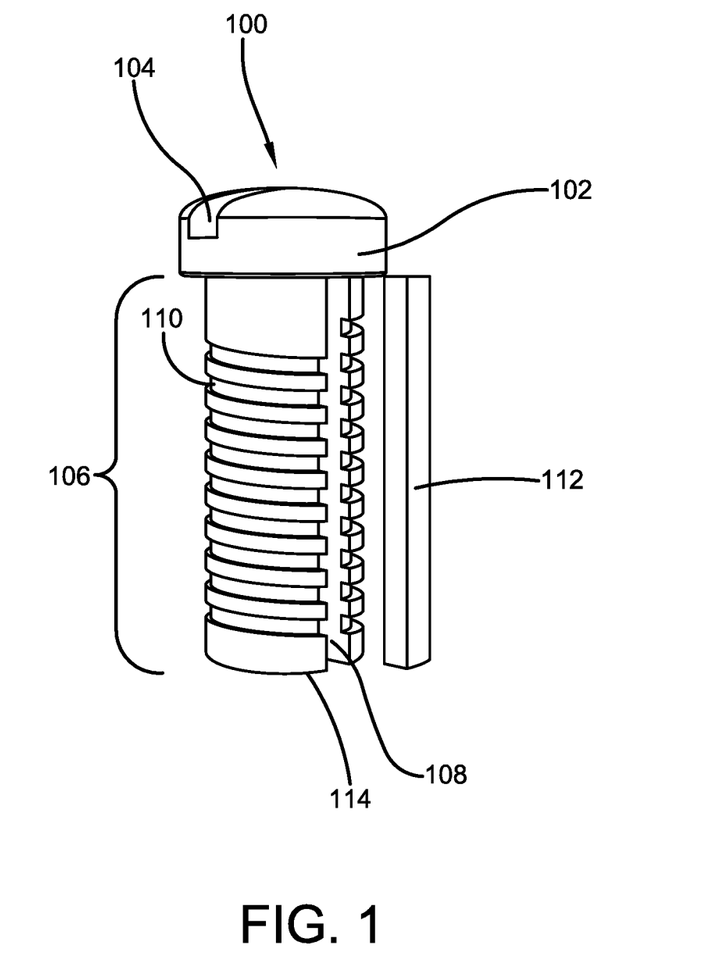
FIG. 1 illustrates a perspective view of one potential embodiment of a novel screw of the present invention for eyeglass lenses and rims in accordance with the disclosed architecture.
Figure 3:
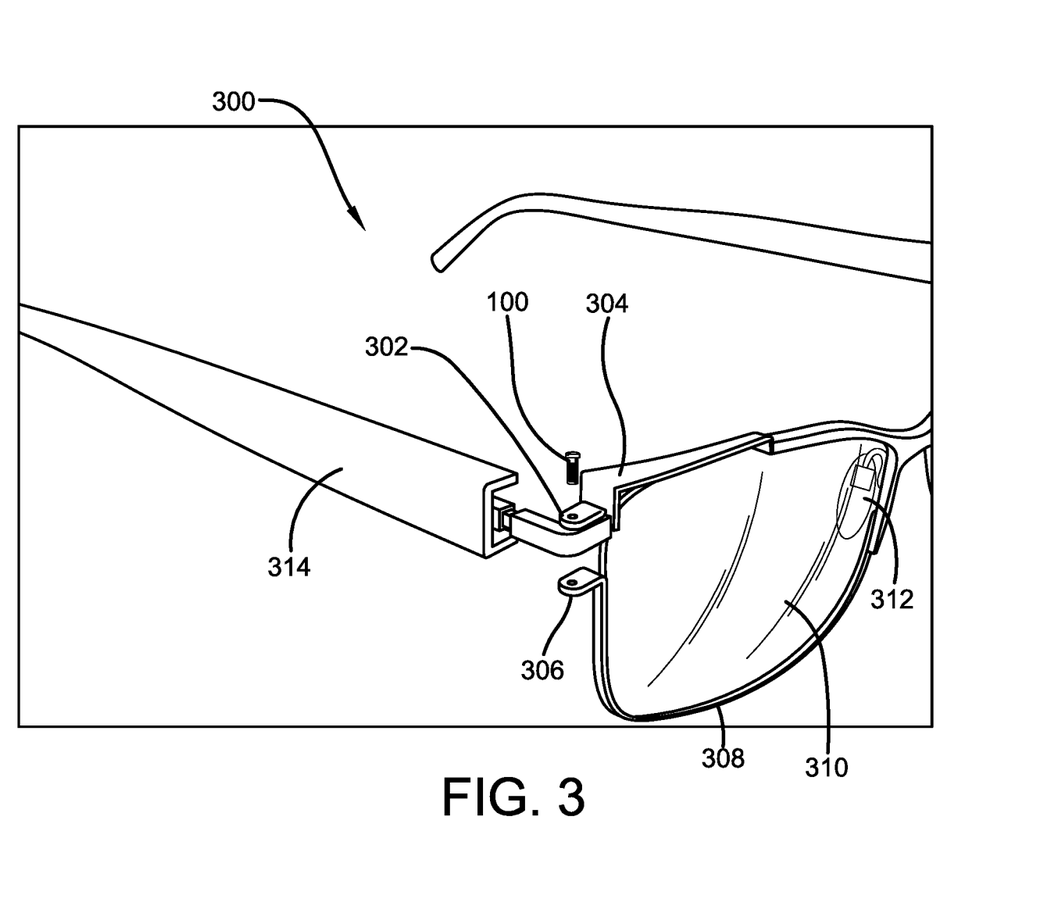
FIG. 3 illustrates a perspective view showing the eyeglass slots or openings for inserting the novel screw for securing the eyeglass lenses in accordance with the disclosed architecture.

Referring initially to the drawings, FIG. 1 illustrates a perspective view of one potential embodiment of a novel screw 100 of the present invention for eyeglass lenses in accordance with the disclosed architecture. The novel eyeglasses screw 100 of the present invention is specifically used for attaching upper and lower frame or rim component sections together that securely hold the eyeglass lenses as best shown in FIG. 3. When the screw 100 securely attaches the upper and lower frame, the lens of the eyeglass remains secured and does not fall out. More specifically, the screw 100 includes a head 102 having a drive 104, the drive 104 enables a user to use a conventional screwdriver to install the screw 100 in an eyeglass frame. The screw 100 includes a shaft or thread length 106 running from the head 102 to the terminal end 114. The thread length 106 includes substantially circumferential threads 110 along the length of the shaft 106, however, the screw 100 includes a longitudinal channel 108 in the form of a continuous groove or cut running along the thread length 106. The longitudinal channel 108 makes the threads 110 discontinuous unlike conventional screws for eyeglasses. Further, the threads 110 do not protrude from the thread length 106 but are in the form of circumferential cuts in the body of the screw 100. The presence of the longitudinal channel 108 prohibits the unwinding, unscrewing, and counter-rotation of the screw 100 when the screw 100 is installed in an eyeglass frame to secure the lenses therein.

It should be noted that the screw 100 is solid and not hollow. The screw 100 can be made from any metal, alloy, or stainless steel. The threads 110 are not disposed along the longitudinal channel 108 and thus the threads are disposed in non-contiguous manner. Preferably, the longitudinal channel 108 includes a width in the range of from about 2 mm to about 5 mm depending on the diameter of the thread length 106. In one embodiment, the non-contiguous threads 110 can extend circumferentially from about 88% to about 98% of the outer circumference of the screw shaft 106. In another embodiment, the non-contiguous threads 110 can extend circumferentially from about 92% to about 98% of the outer circumference of the screw shaft 106. In still another embodiment, the non-contiguous threads 110 can extend circumferentially from about 94% to about 97% of the outer circumference of the screw shaft 106.

Figure 2:
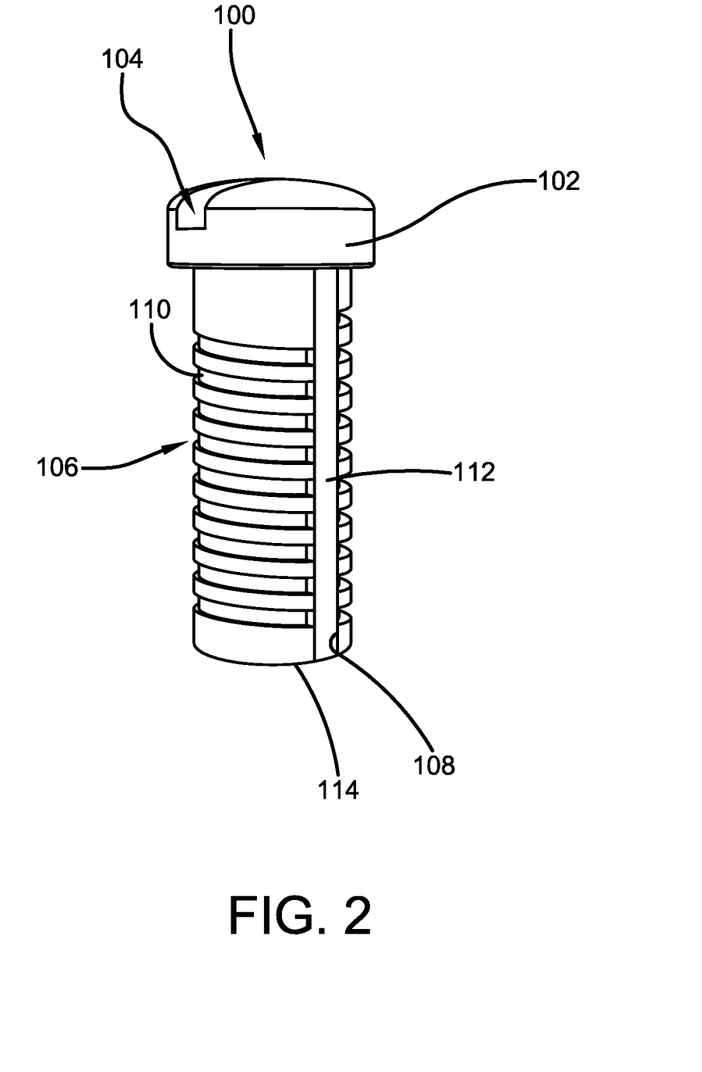
FIG. 2 illustrates a perspective view showing the eyeglasses screw with a longitudinal channel filled with the neoprene or polypropene planar bar in accordance with the disclosed architecture.

Along with the screw 100, an elongated neoprene or polypropene planar bar 112 is commercially available in accordance with the present invention. The neoprene planar bar 112 is configured to be positioned in the longitudinal channel 108 as best shown in FIG. 2. The neoprene planar bar 112 is planar and does not have any threads or grooves. The planar bar 112 is dimensioned to fit into the channel 108 such as the thread length 106 includes a threaded portion where threads are disposed and a planar portion along the channel 108 where the planar bar 112 is inserted. The channel 108 upon receiving the planar bar 112 causes a drag and prevents unwinding of the screw when installed in an eyeglass frame to prohibit falling out of the lenses, thereby allowing the screw 100 to secure the lenses of the eyeglasses effectively and for longer periods.

FIG. 2 illustrates a perspective view showing the eyeglasses screw 100 with a longitudinal channel 108 filled with the neoprene planar bar 112 in accordance with the disclosed architecture. As shown, the channel 108 extending along the length of the screw 100 is filled with neoprene or polypropene material planar bar 112. The screw 100 with the inserted planar bar 112 is used for screwing the upper and lower frame components of the eyeglasses together to secure the eyeglass lenses therebetween. The screw can be operated and handled like a conventional screw and installed using a conventional screwdriver.

The screw 100 with the installed neoprene planar bar 112 acts as a self-sealing fastener for resisting virtually all chemical and environmental conditions. Further, the head 102 of the screw 100 can be a pan head, socket cap head, or any other head type. Preferably, the screw 100 is a fillister head screw with a slightly convex top surface.

FIG. 3 illustrates a perspective view showing the eyeglass slots for inserting the novel screw 100 for securing the eyeglass lens in accordance with the disclosed architecture. The first slot 302 positioned on the upper frame 304 and the second threaded slot 306 positioned on the lower frame 308 are fastened together by the screw 100 with neoprene planar bar 112 positioned inside the channel 108. The screw 100 is rotatably slid through the slots 302 and screwed into threaded slot 306 to fasten the frame components 304,308 together. The screw 100 allows the lens 310 to be secured easily and effectively for longer periods with the screw 100 providing drag and resistance to unwinding/unscrewing of the screw 100 automatically during use of the eyeglasses 300.

It should be appreciated that similar slots are positioned on the frame components 304,308 for the other lens of the eyeglasses 300. A similar novel screw 100 is used for fastening those slots to secure the other lens. The method of securing the frame components is the same for both the lenses and is therefore not explained again for brevity.

Figure 4:
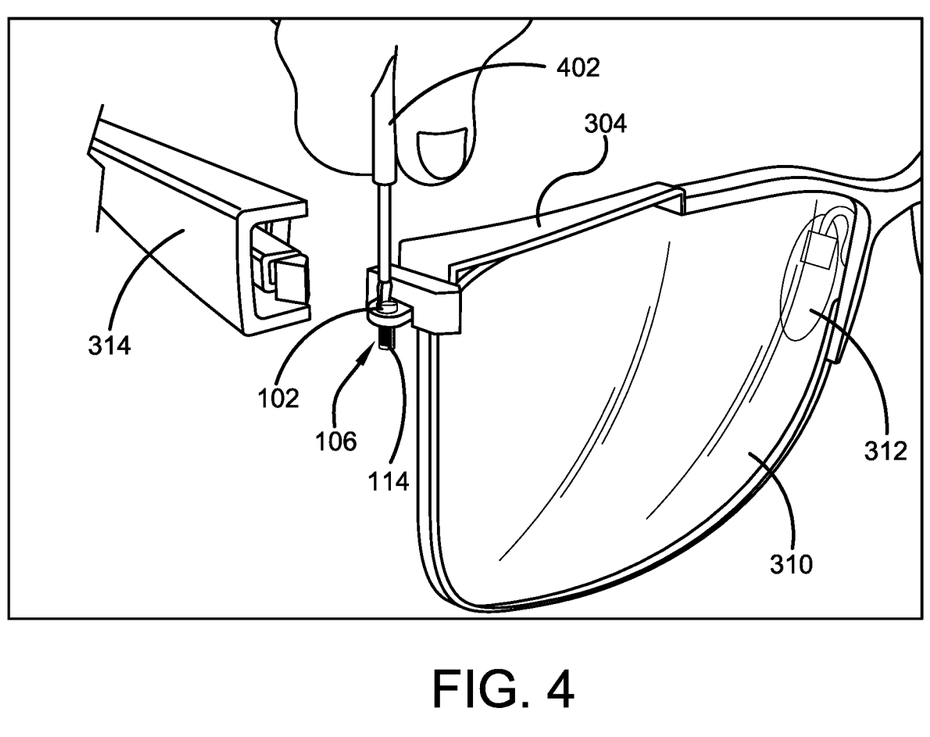
FIG. 4 illustrates a perspective view showing the eyeglasses screw being installed in the eyeglasses to fit the lens in the frame portions in accordance with the disclosed architecture.

FIG. 4 illustrates a perspective view showing the eyeglasses screw 100 being installed in the eyeglass 300 to secure the lens 310 in accordance with the disclosed architecture. As shown, a conventional screwdriver 402 is used for screwing the screw 100 into the eyeglasses 300. In use, the screwdriver 402 is engaged to the driver 104 of the screw 100 and is rotated to rotatably slide the screw 100 inside the slots as shown in FIG. 3 to secure the lens 310.

It should be appreciated that although the disclosure focuses on use of the screw 100 for securing the lens 310 in its place, the screw 100 can be made in various dimensions to use with other components such as nose piece 312 and temple 314 of the eyeglasses 300.

Figure 5:
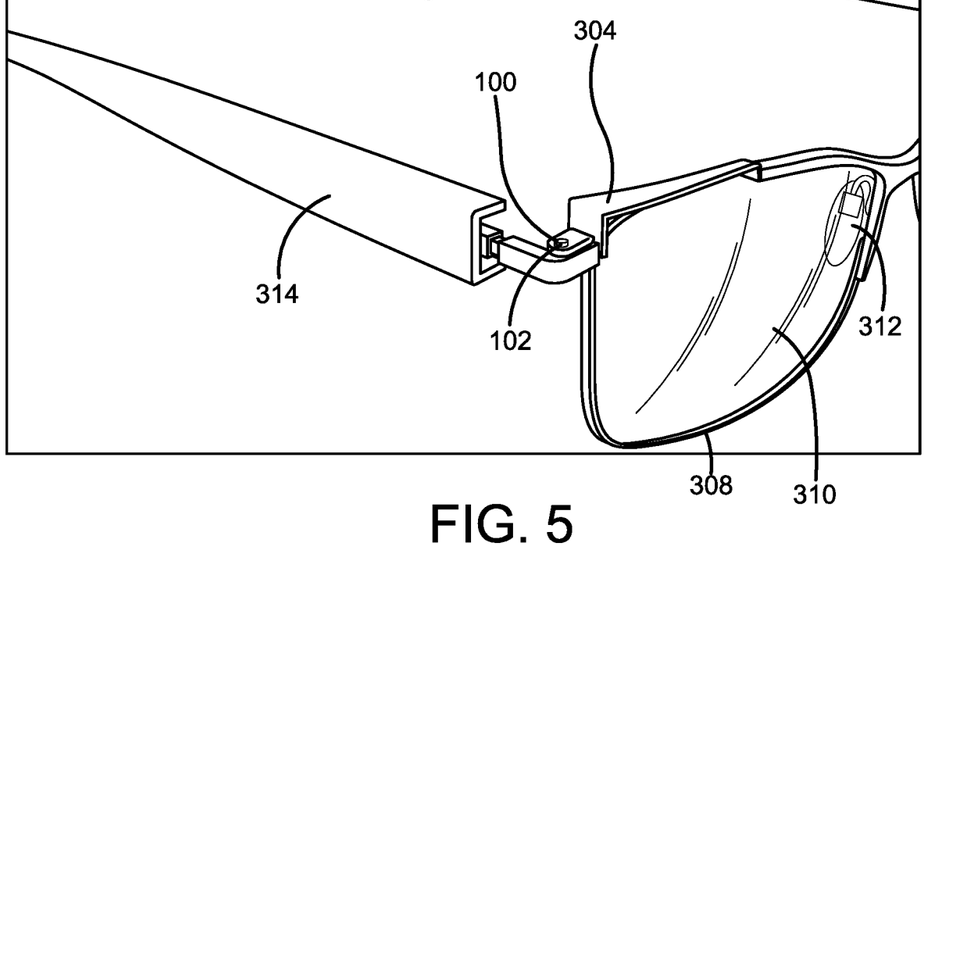
FIG. 5 illustrates a perspective view showing the screw installed in the eyeglasses in accordance with the disclosed architecture.

FIG. 5 illustrates a perspective view showing the screw 100 installed in the eyeglasses 300 in accordance with the disclosed architecture. As shown, the upper frame or rim component 304 and the lower frame or rim component 308 are fastened together to form a closed loop in which the lens 310 is secured therebetween. The screw remains securely in the slots to keep the lenses intact and prevents same from falling out and thus prevents breaking of the lenses. The screw eliminates inconvenient repairs of the lenses and thus saves cost for the users.

It should be appreciated that screw 100 with neoprene 112 eyeglass lenses can be sold in a repair kit for existing lenses or sold directly to manufacturers to pre-install in new models. The screw 100 with neoprene 112 can be a part of the new eyeglasses purchased by a consumer.

The screw 100 with corresponding neoprene 112 can come in separate packages of ten screws, fifty screws, hundred screws or more. The screw can also be sold as a kit that may include a small screwdriver, a small bottle of cleaning solution, and a scratch free cloth.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "novel screw", "eyeglass lens screw", "eyeglasses screw", and "screw" are interchangeable and refer to the eyeglasses screw 100 of the present invention.

Notwithstanding the forgoing, the eyeglass lens screw 100 and the neoprene planar bar 112 of the present invention can be of any suitable size and configuration as is known in the art without affecting the overall concept of the invention, provided that it accomplishes the above stated objectives. One of ordinary skill in the art will appreciate that the size, configuration, and material of the eyeglasses screw 100 and the neoprene planar bar 112 as shown in the FIGS. are for illustrative purposes only, and that many other sizes and shapes of the eyeglasses screw 100 and the neoprene planar bar 112 are well within the scope of the present disclosure. Although the dimensions of the eyeglasses screw 100 and the neoprene planar bar 112 are important design parameters for user convenience, the eyeglasses screw 100 and the neoprene planar bar 112 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An eyeglass screw for attaching eyeglass frame components, the eyeglass screw comprising:
   a shaft outer circumference having non-contiguous threads extending around said shaft outer circumference, wherein said non-contiguous threads extend circumferentially from about 88% to about 98% of said shaft outer circumference;
   a head at a first terminal end;
   a longitudinal channel extending from said head to a second terminal end; and
   a planar bar secured in said longitudinal channel, wherein said planar bar comprises a material selected from a group consisting of a neoprene and a polypropene, wherein said eyeglass frame components comprise a top frame section and a bottom frame section, and further wherein said eyeglass screw is inserted into said top frame section and said bottom frame section for tightening said top frame section to said bottom frame section and securing a lens therebetween.

2. The eyeglass screw of claim 1, wherein said eyeglass screw is in the form of a fillister head screw.

3. The eyeglass screw of claim 1, wherein said non-contiguous threads extend circumferentially from about 92% to about 98% of said shaft outer circumference.

4. The eyeglass screw of claim 1, wherein said non-contiguous threads extend circumferentially from about 94% to about 96% of said shaft outer circumference.

5. The eyeglass screw of claim 4, wherein said longitudinal channel is a continuous channel having a constant cross section extending from said head to said second terminal end.

6. The eyeglass screw of claim 5, wherein said head is selected from a group consisting of a pan head and a socket cap head.

7. An eyeglass screw for attaching eyeglass frame components, the eyeglass screw comprising:
   a shaft outer circumference including non-contiguous threads extending around said shaft outer circumference, wherein said non-contiguous threads extend circumferentially from about 94% to about 97% of said shaft outer circumference;
   a head at a first terminal end;
   a longitudinal channel extending from said head to a second terminal end, wherein said longitudinal channel is a continuous channel having a constant cross section extending from said head to said second terminal end, and further wherein said longitudinal channel includes a planar bar secured therein and said planar bar is comprised of a material selected from a group consisting of a neoprene and a polypropene; and
   said eyeglass frame components comprise a top frame section and a bottom frame section, wherein said eyeglass screw is insertable into said top frame section and said bottom frame section for tightening said top frame section to said bottom frame section and securing a lens therebetween.

8. The screw of claim 7, wherein said eyeglass screw is in the form of a fillister head screw.

9. The screw of claim 7, wherein said non-contiguous threads extend circumferentially from about 94% to about 96% of said shaft outer circumference.

10. The screw of claim 7, wherein said head is selected from a group consisting of a pan head and a socket cap head.

11. The screw of claim 7, wherein said planar bar is comprised of neoprene.

12. An eyeglass system comprising:
    a plurality of eyeglass frame components;
    an eyeglass screw comprising a shaft outer circumference having non-contiguous threads extending around said shaft outer circumference, wherein said non-contiguous threads extend circumferentially from about 93% to about 98% of said shaft outer circumference; and
    said eyeglass screw further comprising a head at a first terminal end and a longitudinal channel extending from said head to a second terminal end, wherein said longitudinal channel is a continuous channel having a constant cross section extending from said head to said second terminal end, wherein said longitudinal channel includes a planar bar comprised of a neoprene secured therein.

13. The eyeglass system of claim 12, wherein said eyeglass frame components comprise a top frame section and a bottom frame section, and further wherein said eyeglass screw is insertable into said top frame section and said bottom frame section for tightening said top frame section to said bottom frame section and securing a lens therebetween.

14. The eyeglass system of claim 12, wherein said eyeglass frame components comprise a top frame section, a temple, a lens, and a bottom frame section, wherein said eyeglass screw is insertable into said top frame section, said temple, and said bottom frame section for tightening said top frame section to said bottom frame section and securing the lens therebetween.

15. The eyeglass system of claim 12, wherein said eyeglass frame components comprise a frame section and a temple, wherein said eyeglass screw is insertable into said frame section and said temple for tightening said frame section and securing a lens therein.

16. The eyeglass system of claim 15, wherein said eyeglass screw is in the form of a fillister head screw.

17. The eyeglass system of claim 13, wherein said non-contiguous threads extend circumferentially from about 94% to about 97% of said shaft outer circumference.

18. The eyeglass system of claim 12, wherein said non-contiguous threads extend circumferentially from about 94% to about 97% of said shaft outer circumference.

19. The eyeglass system of claim 15, wherein said non-contiguous threads extend circumferentially from about 94% to about 97% of said shaft outer circumference.

20. The eyeglass system of claim 19, wherein said head is selected from a group consisting of a pan head and a socket cap head.

* * * * *